(No Model.)

L. McCARTHY.
INSULATING COUPLING.

No. 501,021. Patented July 4, 1893.

WITNESSES
Arthur F. Randall
Robert Wallace

INVENTOR
Louis McCarthy
by Macleod Calver & Randall
his Attys

UNITED STATES PATENT OFFICE.

LOUIS McCARTHY, OF BOSTON, MASSACHUSETTS.

INSULATING COUPLING.

SPECIFICATION forming part of Letters Patent No. 501,021, dated July 4, 1893.

Application filed March 7, 1892. Serial No. 423,988. (No model.)

*To all whom it may concern:*

Be it known that I, LOUIS MCCARTHY, a citizen of the United States, residing at Boston in the county of Suffolk and State of Massachusetts, have invented certain new and useful Improvements in Insulating Couplings, of which the following is a specification, reference being had therein to the accompanying drawings.

Insulating couplings such as are used in connection with gasaliers and the like are commonly constructed of two short tubes each of which is properly threaded in order that the coupling may be screwed onto the ends of the gas pipes which are to be connected. These short tubes are each provided with a flange which in the finished coupling are separated by an interposed layer of insulating material, the parts being firmly secured together by bolts which pass through the flanges and through the interposed layer of insulating material. These bolts require to be insulated at one end from the flanges through which that end of the bolt passes. To effect this insulation the hole in the flange through which the bolt passes is made considerably larger in diameter than the bolt and the space between the bolt and the walls of the hole is filled with insulating material. The head of the bolt is also commonly insulated from the flange by placing underneath the head a washer of insulating material. As the parts of the coupling require to be very tightly compressed and held together there is a great pressure on the bolt heads and any insulating material known to me is apt to be cracked or broken or its insulating quality impaired in the process of riveting the parts together. Washers of metal have been placed underneath the bolt head on top of the washers of insulating material but these are at best only partially effective in obviating the difficulty.

My invention has for its object to provide an insulating coupling so constructed as to obviate this difficulty while at the same time producing an effective coupling which may be quickly and cheaply constructed by ordinary workmen.

My invention is fully set forth in the following description and the novel features thereof are pointed out in the claims which are appended hereto and made a part hereof.

The accompanying drawings show a coupling embodying my invention.

Figure 3:
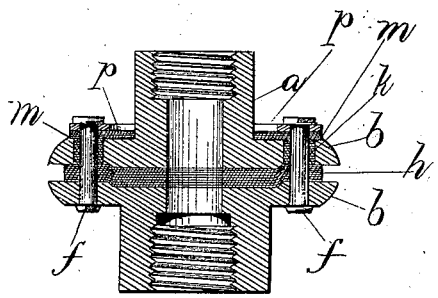
Figure 2:
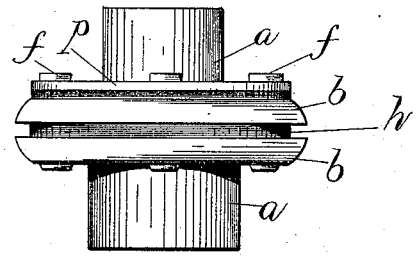
Figure 1:
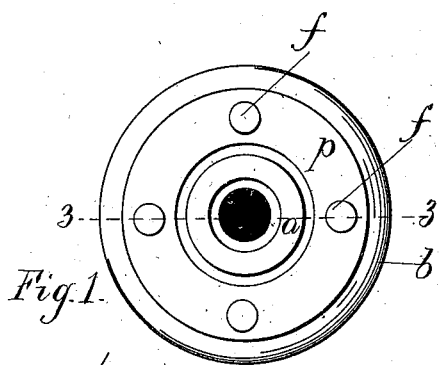
Figure 4:
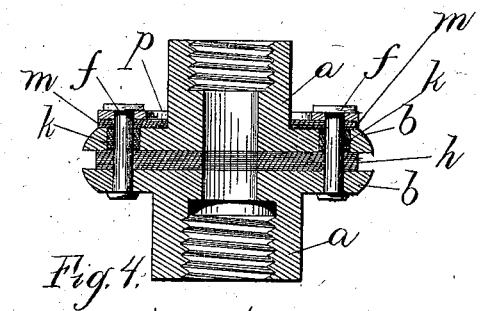

Figure 1 of said drawings is a plan view of the coupling. Fig. 2 is a side elevation. Fig. 3 is a vertical section on line 3—3 Fig. 1. Fig. 4 is a similar section showing a coupling with the proximate faces of the flanges flat instead of formed with a depression in one and a corresponding projection in the other as shown in Fig. 3.

The principal metallic portions of the coupling are the short tubes or nipples $a$ each of which is properly screw threaded as shown to receive the ends of the gas pipes which are to be connected. These tubes are provided with flanges $b$ at their proximate ends. Between the flanges is interposed a layer or mass $h$ of insulating material which may be sheet mica or any other of the well-known materials used for insulation. The mass or layer $h$ has a central aperture coincident with the hole in the tube $a$ to permit the passage of the gas. The parts are firmly compressed and secured together by means of bolts $f$ which pass through the flanges $b$ and through the interposed layer of insulating material as shown. It is necessary that the bolts $f$ should be fully insulated from one of the flanges $b$. To accomplish this, the hole in the flanges through which the bolt passes is made considerably larger than the bolt and the space around the bolt in the hole is filled with insulating material as shown at $k$, Figs. 3 and 4. It is also necessary to insulate the head of the bolt from the flange $b$ and to accomplish this the layer of insulating material $m$ is placed on the flange and I prefer to make this layer $m$ of a width substantially equal to the width of the flange as shown. If sheet mica be employed as an insulator I form the layer $m$ of a series of disks superimposed one upon the other and each having central apertures large enough to admit the tube $a$. These disks are shaped like washers and are placed around the tube $a$ on the flange $b$. On the top of the insulating washers $m$ I place a ring or strip $p$ of metal against which the heads of the bolts $f$ may rest. The bolts pass through the washers of insulating material $m$ and through the metallic ring or strip $p$. The ring $p$ is made preferably of a width slightly greater than the diameter of the heads of the bolts $f$.

By this form of construction the parts may be firmly compressed and the bolts headed down properly and so as to hold the parts firmly together without endangering the insulation.

The employment of a ring or strip $p$ of metal instead of small disks or washers of metal not only increases the strength of the parts but considerably cheapens the cost of construction by lessening the number of parts and making it possible to do the work more quickly and without the aid of other than ordinary workmen.

As will be obvious my invention is applicable to any insulator having metallic portions which require to be bolted together by bolts which must be insulated from one or both of the said metallic portions.

What I claim is—

An insulator comprising flanged metallic portions, a layer of insulating material interposed between said flanged portions, securing bolts passing through said flanged portions and said interposed layer of insulating material, said bolts being insulated from one of said flanged portions by a surrounding layer of insulating material, and a metallic strip or ring through which the said bolts pass, said strip or ring being located under the heads of said bolts and interposed between said heads and the insulating material which surrounds said bolts, whereby said bolts may be headed down without danger of injuring the insulating material which surrounds them and which insulates them from the adjacent flanged metallic portion, substantially as set forth.

In testimony whereof I affix my signature in presence of two witnesses.

LOUIS McCARTHY.

Witnesses:
WM. A. MACLEOD,
ROBERT WALLACE.